United States Patent [19]

Steinseifer

[11] Patent Number: 4,846,000
[45] Date of Patent: Jul. 11, 1989

[54] ARRANGEMENT FOR MEASURING THE STRESS OF MOUNTED DRIVING BELTS

[75] Inventor: Dieter Steinseifer, Siegen, Fed. Rep. of Germany

[73] Assignee: U.S. Phillips Corp., New York, N.Y.

[21] Appl. No.: 117,129

[22] Filed: Nov. 4, 1987

[30] Foreign Application Priority Data

Nov. 6, 1986 [DE] Fed. Rep. of Germany ....... 3637922

[51] Int. Cl.$^4$ .............................................. G01L 5/04
[52] U.S. Cl. .................................. 73/862.47; 340/668
[58] Field of Search ........... 73/862.19, 862.45, 862.47, 73/862.48; 340/668

[56] References Cited

U.S. PATENT DOCUMENTS

| | | | |
|---|---|---|---|
| 2,471,999 | 5/1949 | Boos | 73/862.47 |
| 3,572,110 | 3/1971 | James et al. | 73/862.48 |
| 3,943,761 | 3/1976 | Shoberg et al. | 73/862.48 |

Primary Examiner—Charles A. Ruehl
Attorney, Agent, or Firm—Thomas A. Briody

[57] ABSTRACT

Two supporting elements (3) support a section of the driving belt, and a sensor (10) engages the driving belt in the central region between the supporting elements and deflects this belt towards the imaginary connection line between the supporting elements. In order that different thicknesses of driving belts (2) do not falsify the measuring result, the supporting elements (3) are displaceable and are pressed against the driving belt with a force which is larger than the counterforce applied by the sensor (10). Two stationary engagement elements (11) are arranged directly opposite to the supporting elements (3) so that the driving belt (2) is fixed at two places between a supporting element and the associated engagement element.

9 Claims, 1 Drawing Sheet

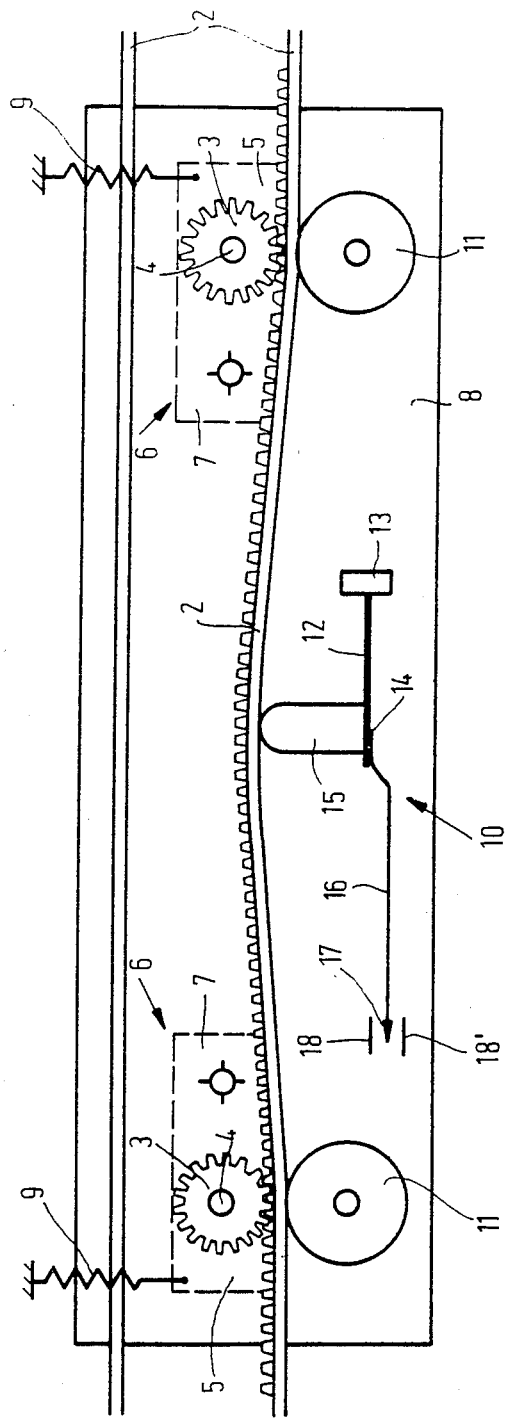

4,846,000

ARRANGEMENT FOR MEASURING THE STRESS OF MOUNTED DRIVING BELTS

BACKGROUND OF THE INVENTION

The invention relates to an arrangement for measuring the stress of mounted driving belts, more particularly toothed belts. Two supporting elements support a section of the driving belt and a sensor engages the driving belt in the central region between the supporting elements and deflects this belt towards the imaginary connection line between the supporting elements.

DE-PS-2526423 discloses an arrangement of the kind mentioned in the opening paragraph, in which the supporting elements are stationary with respect to the measuring arrangement. Different thicknesses of the driving belts influence the engagement point between the sensor and the belt. The displacement of the engagement point due to thickness differences of the belt is measured in addition to the deflection of the belt due to action of force and thus falsifies the measuring result.

SUMMARY OF THE INVENTION

The invention has for its object to construct a measuring arrangement different thicknesses of the driving belt do not influence the measuring result.

According to the invention, this object is achieved in that the supporting elements are displaceable and are pressed against the driving belt with a force which is larger than the counterforce applied by the sensor and in that two stationary engagement elements are arranged directly opposite to the supporting elements so that the driving belt is fixed between a supporting element and the associated engagement element at two places.

Since the engagement elements and the sensor engage the same side of the driving belt, different thicknesses of the driving belt do not influence the measuring result.

A constructively simple arrangement is obtained Each of the supporting elements is arranged on a pivotable lever. Advantageously, the lever is pivoted by means of a spring force towards the driving belt.

In an embodiment requiring only little mounting spaces, the lever is pivotably journalled on one side at a holding frame and carries at the free end the supporting element.

In order that no additional longitudinal forces are caused by the supporting elements, these elements are advantageously in the form of rotatable supporting rollers. For the same reason, the engagement elements may also be in the form of rotatable engagement rollers.

In a preferred embodiment of the invention, the sensor comprises a blade spring, which is clamped at one end and to whose free end a force transmission member is secured, which transmits the pressure of the blade spring to the driving belt.

In order to increase the deflection of the sensor, a pointer is secured to the free end of the blade spring in its direction of prolongation.

In order that belts stretched too loosely or too tightly can readily be recognized, limit value switches are provided, which can be actuated by the deflection of the sensor and whose positions can be variable for adjusting different tolerance limits according to an advantageous further embodiment.

BRIEF DESCRIPTION OF THE DRAWING

FIG. 1 shows a measuring arrangement for measuring the stress of mounted driving belts.

DETAILED DESCRIPTION OF THE PREFERRED EMBODIMENT

A section of the toothed belt 2 is located on the supporting rollers 3, which are each secured through a respective bearing shaft 4 to the pivotable end 5 of a respective lever 6 having & one arm. Each lever 6 is supported by its other end 7 at the holding frame 8. Two engagement rollers 11 are arranged directly opposite to the supporting rollers 3 and are rotatably journalled on the holding frame 8. The belt is thus fixed at two places between an engagement roller 11 and a supporting roller 3. Compression springs 9, which engage pivotable ends 5 of each lever 6, ensure that the supporting roller 3 presses against the driving belt 2 with a force & which is larger than the counterforce caused by a sensor 10.

The force transmission member 15 of the sensor 10 engages in the central region between the two engagement rollers 11 the same side of the belt 2 and presses this belt with a force of a blade spring 12 corresponding to the respective stress of the belt 2 with different strengths. The blade spring 12 is clamped at its one end 13. The free end 14 of the blade spring 12 is provided with a pointer 16, which indicates on an enlarged scale the comparatively small deflection path of the toothed belt 2. At the area of the free end 17 of the pointer 16 two limit value switches 18 and 18' are situated, which are each adjustable for different tolerance limits. As soon as the free end 17 of the pointer 1 touches one of the limit value switches 18 or 18', an electrical contact is established and a signal is generated which indicates when the belt 2 is stretched too tightly and too loosely, respectively. A pointer position between the two limit value switches 18 and 18' means that the nominal value of the stress of the belt neither exceeds nor falls below an admissible value.

. With different thicknesses of the toothed belt, the supporting rollers 3 are displaced correspondingly with respect to the engagement rollers 11. However, the stationary engagement point at the supporting rollers 11 determines the measurement indication.

The principle of operation (shown in the embodiment) of the sensor, in which the deflection of the belt obtained by a given spring force is measured, is particularly simple. However, according to the invention a measuring method may also be used, which—as described in DE PS 2526423—indicates the reaction force of the belt occurring with a given belt deflection.

Further, the displaceability of the driving elements may also be obtained by means of push rod support. The pressure forces may also be produced in an arbitrary other known manner, for example pneumatically.

What is claimed is:

1. An arrangement for measuring the stress of mounted driving belts, more particularly toothed belts, comprising two supporting elements, which support a section of the driving belt, and a sensor, which engages the driving belt in the central region between the supporting elements and deflects this belt towards the imaginary connection line between the supporting elements, characterized in that the supporting elements (3) are displaceable and are pressed against the driving belt (2) with a force which is larger than the counterforce applied by the sensor (10), and in that two stationary engagement elements (11) are arranged directly opposite to the supporting elements (3) so that the driving belt (2) is fixed at two places between a supporting element (3) and the associated engagement element (11).

2. A measuring arrangement as claimed in claim 1, characterized in that the supporting elements (3) are each arranged on a respective pivotable lever (6).

3. A measuring arrangement as claimed in claim 2, characterized in that each lever (6) is pivoted by means of a spring force (9) towards the driving belt (2).

4. A measuring arrangement as claimed in claim 2, characterized in that each lever (6) is journalled pivotably on one side at a holding frame (8) and carries at the free end (5) the respective supporting element (3).

5. A measuring arrangement as claimed in claim 1, characterized in that the supporting elements are in the form of rotatable supporting rollers (3).

6. A measuring arrangement as claimed in claim 1, characterized in that the engagement elements are in the form of rotatable engagement rollers (11).

7. A measuring arrangement as claimed in claim 1, characterized in that the sensor (10) comprises a blade spring (12), which is clamped at one end and to whose free end force transmission member (15) is secured, which transmits the pressure of the blade spring (12) to the driving belt (2).

8. A measuring arrangement as claimed in claim 7, characterized in that a pointer (16) is secured to the free end (14) of the blade spring (12) in its direction of elongation.

9. A measuring arrangement as claimed in claim 1, characterized in that limit value switches (18,18') are provided, which can be actuated by the deflection of the sensor (10).

* * * * *